2,957,005
ω-ALDEHYDES OF N-SUBSTITUTED ω-CYANO-METHYLENE-INDOLINE DERIVATIVES

Max Coenen, Gruiten, Rhineland, and Oskar Weissel, Krefeld-Urdingen, Germany, assignors to Farbenfabriken Bayer Aktiengesellschaft, Leverkusen, Germany, a corporation of Germany No Drawing. Filed May 26, 1958, Ser. No. 737,474
Claims priority, application Germany June 5, 1957
19 Claims. (Cl. 260—319)

This application is concerned with ω-aldehydes of N-substituted ω-cyanomethylene indoline derivatives and with a process for the production thereof.

It is known to introduce aldehyde groups into N-substituted indolines which contain a reactive methylene-group in the 2-position and two alkyl groups in the 3-position, by reacting methyl formanilide with such N-stituted N-indolines in the presence of chlorine-containing acid condensation agents and preferably in the presence of inert solvents.

It has now been found that by reacting compounds of the general formula:

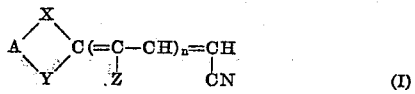

(I)

wherein

A is a divalent radical selected from the group consisting of
  (1) Phenylene radicals substituted in 5- and 6-position by a substituent selected from the group consisting of hydrogen, chloride, bromine, methyl, methoxy, ethoxy, methylmercapto, ethyl mercapto, phenyl, nitro; and $NR_1R_2$, $R_1$ and $R_2$ being a substituent selected from the group consisting of hydrogen, methyl, ethyl, propyl, butyl, hydroxyethylene, chloroethylene, and cyanoethylene, and
  (2) The naphthalene radical,
X is a dialkylated carbon atom with alkyl radicals selected from the group consisting of methyl, ethyl, propyl and butyl,
Y is a monosubstituted nitrogen atom, the substituent being selected from the group consisting of saturated unbranched and branched alkyl radicals up to 18 carbon atoms and the phenyl radical,
Z is a substituent selected from the group consisting of H and CN, $n$ is a whole number from 0 to 1, with a N-disubstituted formic acid amide in the presence of an inorganic acid chloride as condensation agent, and preferably in the presence of a solvent, there are obtained ω-aldehydes of cyanomethylene indoline derivatives of the general formula:

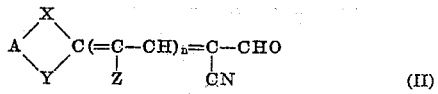

(II)

Thus, for example, there may be obtained the hitherto unknown 1,3,3-trimethyl-2-cyanomethylene indoline-ω-aldehyde from 1,3,3-trimethyl-2-cyanomethylene indoline.

Other suitable starting materials are, for example, 1,3,3,5-tetramethyl-2-cyanomethylene indoline,
1,3,3-trimethyl-5-methoxy-2-cyanomethylene indoline,
1,3,3-trimethyl-2-(α,ω-dicyanopropenylidene)-indoline,
1,3,3-trimethyl-5-chloro-2-cyanomethylene indoline,
1,3,3-trimethyl-5-phenyl-2-cyanomethylene indoline,
1,3,3-trimethyl-2-(ω-cyanopropenylidene)-indoline,
1,3,3-trimethyl-5-nitro-2-cyanomethylene indoline,
1,3,3-trimethyl-5-methylmercapto-2-cyanomethylene indoline,
1,3,3,-trimethyl-5-ethylmercapto-2-cyanomethylene indoline,
1,3,3-trimethyl-5-ethoxy-2-cyanomethylene indoline,
1,3,3-trimethyl-5-dimethylamino-2-cyanomethylene indoline,
1,3-dimethyl-3-ethyl-2-cyanomethylene indoline,
1-ethyl-3,3-dimethyl-2-cyanomethylene indoline,
1-octadecyl-3,3-dimethyl-2-cyanomethylene indoline,
1,3,3,5,6-pentamethyl-2-cyanomethylene indoline,
1,3,3-trimethyl-2-cyanomethylene-5,6-benzo indoline and
1,3,3-trimethyl-2-cyanomethylene-6,7-benzo indoline.

Thus there may be obtained:

1,3,3,5 - tetramethyl - 2 - cyanomethylene indoline - ω-aldehyde,
1,3,3 - trimethyl - 5 - methoxy - 2 - cyanomethylene indoline-ω-aldehyde,
1,3,3 - trimethyl - 2 - (α,ω - dicyanopropenylidene) - indoline-ω-aldehyde,
1,3,3 - trimethyl - 5 chloro - 2 - cyanomethylene indoline-ω-aldehyde,
1,3,3 - trimethyl - 5 - phenyl - 2 - cyanomethylene indoline-ω-aldehyde,
1,3,3 - trimethyl - 2 - (ω - cyanopropenylidene) - indoline-ω-aldehyde,
1,3,3 - trimethyl - 5 - nitro - 2 - cyanomethylene indoline-ω-aldehyde,
1,3,3 - trimethyl - 5 - methylmercapto - 2 - cyanomethylene indoline-ω-aldehyde,
1,3,3 - trimethyl - 5 - ethylmercapto - 2 - cyanomethylene indoline-ω-aldehyde,
1,3,3 - trimethyl - 5 - ethoxy - 2 - cyanomethylene indoline-ω-aldehyde,
1,3,3 - trimethyl - 5 - dimethylamino - 2 - cyanomethylene indoline-ω-aldehyde,
1,3 - dimethyl - 3 - ethyl - 2 - cyanomethylene indoline-ω-aldehyde,
1-ethyl-3,3-dimethyl-2-cyanomethylene indoline-ω-aldehyde,
1 - octadecyl - 3,3 - dimethyl - 2 - cyanomethylene indoline-ω-aldehyde,
1,3,3,5,6 - pentamethyl - 2 - cyanomethylene indoline - ω-aldehyde,
1,3,3 - trimethyl - 2 - cyanomethylene - 5,6 - benzo indoline-ω-aldehyde,
1,3,3 - trimethyl - 2 - cyanomethylene - 6,7 - benzo indoline-ω-aldehyde, The starting materials to be used according to the invention differ substantially from the materials hitherto used by the presence of a nitrile group on the methylene group in the ω-position, whereby the activity of the neighbouring hydrogen atom is considerably reduced so that this hydrogen atom is unable to react in an appreciable degree with, for example, acylating or alkylating agents. It was, therefore, surprising that the introduction of the aldehyded group into the ω-position succeeded smoothly and with satisfactory yields.

Indoline derivatives of the Formula I in which $n=0$ are obtainable by the action of cyanogen halides on the corresponding methylene indoline derivatives, for example, by the process according to U.S. patent application Ser. No. 735,992, filed May 19, 1958.

Indoline derivatives of the Formula I in which $n=1$ can, on the other hand, be produced by known processes by the reaction of the corresponding ω-formyl-methylene indolines with cyanoacetic acid or cyanoacetic acid esters followed by saponification and decarboxylation.

Suitable N-disubstituted formic acid amides are those the substituents of which have up to 10 carbon atoms in the whole. Examples thereof are the N-dimethyl-, the N-diethyl-, the N-methylethyl-, the N-dipropyl-, the N-dibutyl-, the N-diamyl-formamide, the N-methyl-, the N-ethyl-, the N-propyl- and the N-butyl-formanilide.

Phosphorous oxychloride, phosgene, thionylchloride and sulfurylchloride can, for example, be used as chlorine-containing acidic condensation agents.

As solvents, chlorinated hydrocarbons such as chlorobenzene and o-dichlorobenzene, are particularly suitable.

Furthermore an excess of the formylising agent or of the condensation agent also may be used as solvent.

The reaction is generally carried out with advantage in the temperature range of 0–120° C.

The new compounds are important intermediates for the synthesis of dyestuffs.

Thus they may be condensed with aromatic amines to azomethin dyestuffs. For example an orange dyestuff suitable as filter dyestuffs there may be obtained by reacting 1,3,3-trimethyl-2-cyanomethylene indoline-ω-aldehyde with p-phenetidine.

The following examples are given for the purpose of illustrating the invention:

*Example 1*

68 grams methyl formanilide are added dropwise with stirring and cooling in a course of 20 minutes to 78 grams phosphorous oxychloride. The mixture is subsequently stirred for a further two hours at 25° C., then diluted with 100 grams o-dichlorobenzene and cooled down to 5° C.

100 grams 1,3,3-trimethyl-2-cyanomethylene indoline are added in small amounts at 5° C. to the solution so obtained. Subsequently the reaction mixture is stirred at room temperature for several hours.

The dark-red, thick slurry is then poured onto ice, rendered alkaline with sodium hydroxide solution and steam-distilled. The distillation residue solidifies to give a dark-coloured cake when poured into cold water, which is separated off and recrystallised from 300 millilitres isopropanol. 1,3,3-trimethyl-2-cyanomethylene indoline-ω-aldehyde is obtained in a form of yellow-orange crystals. Melting point 154–156° C. Yield 75 grams (66 percent of theory).

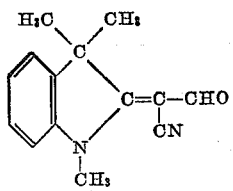

*Analysis.*—C$_{14}$H$_{14}$N$_2$O.—Calculated: C=74.3%; H=6.25%; N=12.40%; O=7.09%. Found: C=74.2%; H=6.45%; N=11.96%; O=7.19%.

*Example 2*

Into 73.0 grams N-dimethyl formamide there are dropped in the course of about 30 minutes under stirring at 10–20° C. 84.3 grams phosphorous oxychloride. In the course of further 30 minutes to the yellow solution thus obtained there are added 106 grams 1,3,3-trimethyl-2-cyanomethylene indoline while arising the temperature to about 60° C. Thus the reaction mixture is held for 60 minutes at 60° C., and for a further 60 minutes at about 80° C. Then the warm viscous solution is put in 2 litres cold water. One obtains a clear solution from which the reaction product is precipitated as almost colourless crystal mass after the addition of 130 millilitres of a 44.7 percent caustic soda solution. The precipitate is separated, washed with water and dried.

Yield: 115 grams (95.4 percent of theory).
Melting point: 149–150° C.

The reaction product is the same obtained according to Example 1.

*Example 3*

53.5 grams 1,3,3,5-tetramethyl-2-cyanomethylene indoline are introduced into a solution of 39 grams phosphorous oxychloride and 34 grams methyl formanilide in 55 grams o-dichlorobenzene at 2° C. so slowly that the temperature does not raise above 5° C. The mixture is subsequently stirred for several hours at room temperature, then poured onto ice with vigorous stirring, cautiously rendered alkaline with sodium hydroxide solution and steam-distilled. The distillation residue solidifies to a dark-coloured cake when poured into cold water, is separated off and recrystallised from 550 millilitres isopropanol with the addition of activated charcoal, 1,3,3,5-tetramethyl-2-cyanomethylene indoline-ω-aldehyde is obtained in the form of yellow crystals.

Melting point: 175° C.
Yield: 32 grams (52.7 percent of theory).

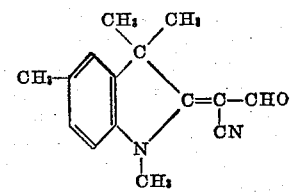

*Analysis.*—C$_{15}$H$_{16}$N$_2$O.—Calculated: C=75.0%; H=6.71%; N=11.67%; O=6.66%. Found: C=75.0%; H=7.07%; N=11.61%; O=6.64%.

*Example 4*

By reaction of 114.2 grams 1,3,3-trimethyl-5-methoxy-2-cyanomethylene indoline with 73.0 grams N-dimethyl formamide and 84.3 grams phosphorous oxychloride in the manner described in Example 2, there are obtained 127 grams (99 percent of theory) 1,3,3-trimethyl-5-methoxy-2-cyanomethylene indoline-ω-aldehyde as a colourless powder. Melting point: 196–198° C. After recrystallisation from isopropanol the melting point is 198–199° C.

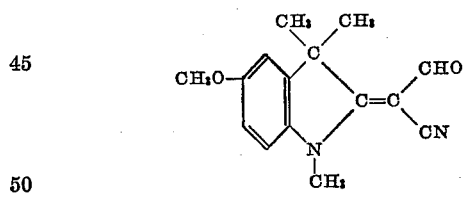

*Analysis.*—C$_{15}$H$_{16}$N$_2$O$_2$.—Calculated: C=70.2%; H=6.28%; N=10.92%; O=12–48%. Found: C=70.2%; H=6.45%; N=10.88%; O=12.67%.

*Example 5*

By reaction of 93.0 grams 1,3,3-trimethyl-5-chloro-2-cyanomethylene indoline with 45.0 grams N-methyl formanilide and 61.5 grams phosphorous oxychloride in the manner described in Example 1 there are obtained 93.5 grams (89.7% of theory) raw 1,3,3-trimethyl-5-chloro-2-cyanomethylene indoline-ω-aldehyde. Melting point: 162–175° C. After recrystallisation from isopropanol the melting point is 180–181° C.

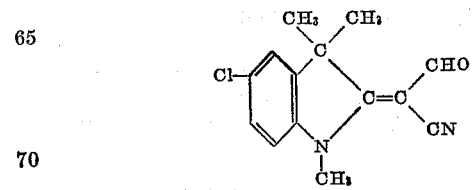

*Analysis.*—C$_{14}$H$_{13}$ClN$_2$O.—Calculated: C=64.49%; H=5.02%; Cl=13.60%; N=10.75%; O=6.14%. Found: C=64.54%; H=5.14%; Cl=13.62%; N=10.61%; O=6.17%.

Example 6

Into 30 millilitres phosphorous oxychloride there are dropped at room temperature under stirring 20 millilitres N-methyl formanilide. The mixture is stirred for further 2 hours at room temperature and then mixed with 28 grams 1,3,3,-trimethyl-2-(ω-cyanopropenylidene)-indoline while rising the temperature to about 50° C. Then the reaction mixture is held for further 16 hours at room temperature while stirring, then put into ice-water. The solution is alkalised and distilled with water steam. The residue is recrystallised from methanol. One obtains 1,3,3-trimethyl-2-(ω-cyanopropenylidene)-indoline-ω-aldehyde as brownish-yellow crystals.

Yield: 10.5 grams.
Melting point: 214–216° C.

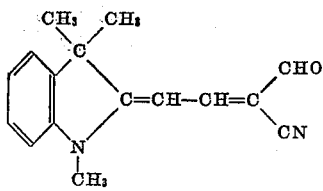

Analysis.—$C_{16}H_{16}N_2O$.—Calculated: C=76.16%; H=6.39%; N=11.10%; O=6.34%. Found: C=76.54%; H=6.79%; N=11.19%; O=6.23%.

Example 7

9 grams 1,3,3-trimethyl-2-(α-ω-dicyano-propenylidene)-indoline, which can be easily obtained by the reaction of the aldehyde described in Example 1 with cyanoacetic acid, is added in portions at 3° C. to the mixture produced according to Example 1 of 5.5 grams phosphorous oxychloride, 5 grams methyl formanilide and 12 grams o-dichlorobenzene. At the end of the addition, the solution is slowly warmed with stirring to 30° C. and stirred at this temperature for several hours. The reaction mixture is subsequently taken up in 35 millilitres chloroform and the solution so obtained shaken up several times with dilute sodium hydroxide solution and water. The aldehyde precipitates out in the form of crystals.
Melting point: 227–229° C. Yield: 4.3 grams.

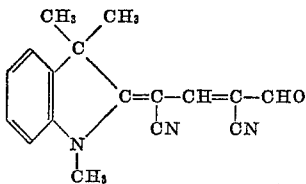

Analysis.—$C_{17}H_{15}N_3O$.—Calculated: C=73.62%; H=5.46%; N=15.15%; O=5.77%. Found: C=73.76%; H=5.64%; N=15.02%; O=5.48%.

Obviously many modifications and variations of the present invention are possible in the light of the above teachings. It is, therefore, to be understood that within the scope of the appended claims the invention may be practiced otherwise than as specifically described.

We claim:

1. ω-Aldehydes of N-substituted ω-cyanomethylene indoline derivatives of the general formula:

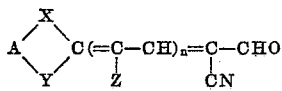

wherein

A is a member of the class consisting of
  (1) phenylene radicals substituted in 5- and 6-position by a member of the class consisting of hydrogen, chloride, bromine, methyl, methoxy, ethoxy, methylmercapto, ethylmercapto, phenyl, nitro and $NR_1R_2$, $R_1$ and $R_2$ being a member of the group consisting of hydrogen, methyl, ethyl, propyl, butyl, hydroxyethylene, chloroethylene, and cyanoethylene, and
  (2) the naphthylene radical, X is a dialkylated carbon atom with alkyl radicals selected from a member of the class consisting of methyl, ethyl, propyl and butyl.

Y is a monosubstituted nitrogen atom, the substituent being selected from a member of the class consisting of saturated unbranched and branched alkyl radicals up to 18 carbon atoms and the phenyl radical, Z is a member of the group consisting of H and CN, n is a whole number from 0 to 1.

2. 1,3,3-trimethyl-2-cyanomethylene indoline-ω-aldehyde.

3. 1,3,3,5-tetramethyl-2-cyanomethylene indoline-ω-aldehyde.

4. 1,3,3-trimethyl-5-methoxy-2-cyanomethylene indoline-ω-aldehyde.

5. 1,3,3-trimethyl-5-chloro-2-cyanomethylene indoline-ω-aldehyde.

6. 1,3,3-trimethyl-2-(ω-cyanopropenylidene)-indoline-ω-aldehyde.

7. Process for the production of ω-aldehydes of N-substituted ω-cyanomethylene indoline derivatives of the general formula

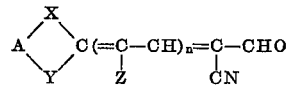

which comprises reacting an ω-cyanomethylene indoline derivative of the general formula:

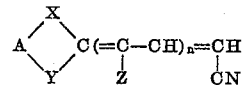

wherein

A is a member of the class consisting of
  (1) phenylene radicals substituted in 5- and 6-position by a substituent selected from the group consisting of hydrogen, chloride, bromine, methyl, methoxy, ethoxy, methylmercapto, ethylmercapto, phenyl, nitro and $NR_1R_2$, $R_1$ and $R_2$ being a substituent selected from the group consisting of hydrogen, methyl, ethyl, propyl, butyl, hydroxyethylene, chloroethylene, and cyanoethylene, and
  (2) the naphthylene radical, X is a dialkylated carbon atom with alkyl radicals selected from a member of the class consisting of methyl, ethyl, propyl and butyl, Y is a monosubstituted nitrogen atom, the substituent being selected from a member of the class consisting of saturated unbranched and branched alkyl radicals up to 18 carbon atoms and the phenyl radical, Z is a member of the group consisting of H and CN, n is a whole number from 0 to 1, with N-disubstituted formic acid amides selected from the group consisting of formic acid amides the two substituents of which being alkyl radicals with up to 10 carbon atoms, and N-alkyl formanilides with said alkyl radicals containing one to four carbon atoms in the presence of an inorganic acid chloride as condensation agent.

8. Process according to claim 7 wherein the N-disubstituted formic acid amide is a member of the class consisting of N-methyl formic acid anilide and N-dimethyl formic acid amide.

9. Process according to claim 7 wherein the condensation agent is a member of the class consisting of phosphorous oxychloride, phosgene, thionylchloride and sulfurylchloride.

10. Process according to claim 7 wherein the reaction is carried out in the presence of an excess of the formic acid amide derivate.

11. Process according to claim 7 wherein the reaction is carried out in the presence of an excess of the condensation agent.

12. Process according to claim 7 wherein the reaction is carried out in the presence of an inert solvent.

13. Process according to claim 12 wherein the chlorinated hydrocarbon is a member of the class consisting of chlorobenzene and o-dichlorobenzene.

14. Process according to claim 7 wherein the reaction is carried out at a temperature between about 0° and about 120° C.

15. Process according to claim 7 wherein the ω-cyanomethylene indoline derivative is 1,3,3-trimethyl-2-cyanomethylene indoline.

16. Process according to claim 7 wherein the ω-cyanomethylene indoline derivative is 1,3,3,5-tetramethyl-2-cyanomethylene indoline.

17. Process according to claim 7 wherein the ω-cyanomethylene indoline derivative is 1,3,3-trimethyl-5-methoxy-2-cyanomethylene indoline.

18. Process according to claim 7 wherein the ω-cyanomethylene indoline derivative is 1,3,3-trimethyl-5-chloro-2-cyanomethylene indoline.

19. Process according to claim 7 wherein the ω-cyanomethylene indoline derivative is 1,3,3-trimethyl-2-(ω-cyanopropenylidene)-indoline.

References Cited in the file of this patent

FOREIGN PATENTS

| | | |
|---|---|---|
| 729,849 | Germany | Jan. 4, 1943 |
| 823,599 | Germany | Dec. 6, 1951 |
| 824,818 | Germany | Dec. 13, 1951 |

OTHER REFERENCES

Coenen: Chemische Ber., vol. 80, pp. 546–553 (1947).
Coenen: Chemische Ber., vol. 82, pp. 66–69 (1949).